Sept. 10, 1929.  B. F. ROBINSON  1,728,138
BANDEAU
Filed April 13, 1929
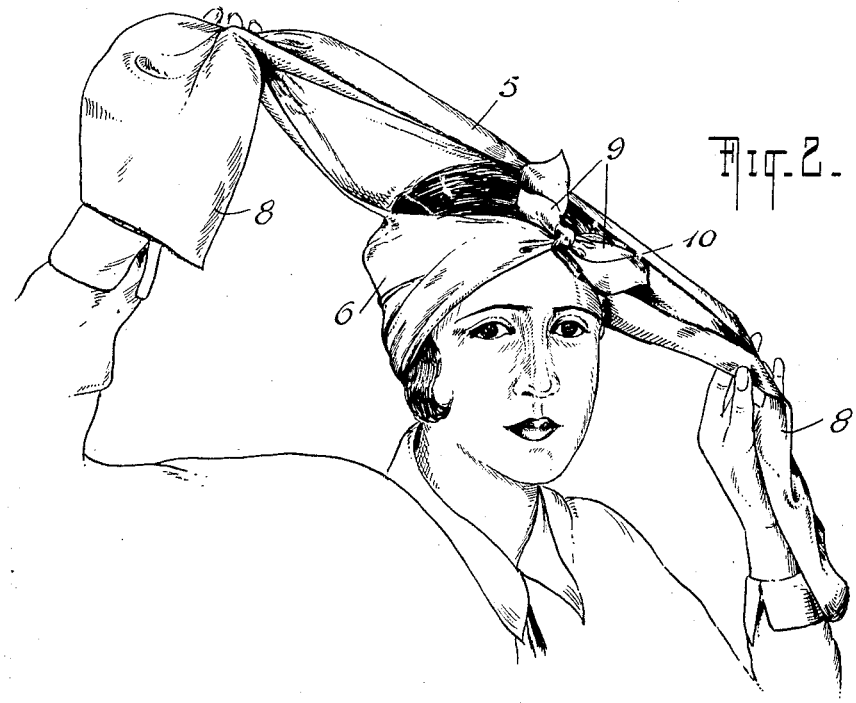
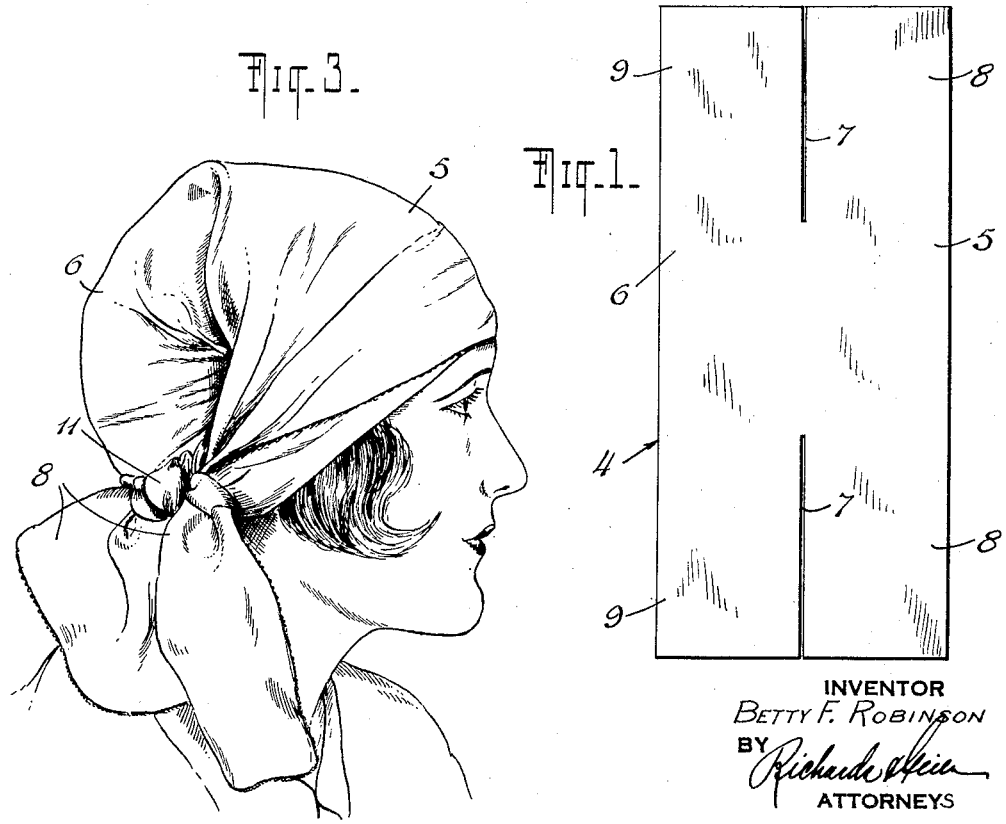
INVENTOR
BETTY F. ROBINSON
BY
ATTORNEYS Patented Sept. 10, 1929.

1,728,138

UNITED STATES PATENT OFFICE.

BETTY F. ROBINSON, OF NEW YORK, N. Y.

BANDEAU.

Application filed April 13, 1929. Serial No. 354,757.

This invention relates generally to improvements in head coverings and has particular reference to a bandeau.

An object of the invention is to provide an improved bandeau of a simple and practical construction which may be readily draped upon the head in a manner to form an attractive covering therefor, which is suitable for use when motoring, at the seashore and in other like instances.

Another object resides in slitting a length of fabric from each end to a point short of the center thereof to provide a pair of sections each having a tying portion at each end thereof, both of which sections may be secured in encircling positions about the head by means of the tying portions, and the combined widths of adjacent tying portions being substantially equal to that of the two sections.

The above and other objects will appear more clearly from the following detailed description when taken in connection with the accompanying drawing, wherein:—

Fig. 1 is a plan view of a bandeau constructed in accordance with the present invention.

Fig. 2 is a perspective view illustrating the application of the bandeau to the head, and Fig. 3 is a side elevation showing the bandeau in its applied position.

In carrying out the invention, use is made of a single length 4 of suitable fabric of rectangular formation and having an attractive color design or the like thereon. Said length is divided into front and rear sections 5 and 6, respectively, by forming a slit 7 in the material at each end thereof, and each section is of sufficient length to completely encircle the head. Each slit extends from the end of the bandeau and preferably along a central longitudinal line to a point short of the center of the length, and after the cutting operation the edges of the slit may be hemstitched so as to provide a neat finish. By thus slitting the material, the sections 5 and 6 are provided, respectively, with tying portions 8 and 9, the combined widths of which are substantially equal to the aggregate width of the sections 5 and 6, and the extremities of which are capable of being tied together when securing the bandeau in position on the head.

When applying the bandeau, the rear section 6 is first positioned with its central portion at the back and slightly to one side of the head, and the tying portions 9 are then extended forward around the head and tied in a knot as indicated at 10 in Fig. 2. The central portion of the section 5 is then brought forwardly over the forehead to the position shown in Fig. 3 in which it covers the knot 10 and the tying ends 8 of said section are extended rearwardly to encircle the head and finally tied into a knot 11 at the back thereof and preferably to one side, as for instance just behind one ear. When thus draped, the section 5 forms a partial covering for the section 6 including the tying portions 9 and knot 10 thereof so that the bandeau then presents a very neat and attractive appearance.

What is claimed is:

A bandeau comprising a rectangular length of material slitted longitudinally from each end thereof to points short of its center to divide said length into sections, and to form a pair of tying portions at each end of the length, the combined widths of each pair of tying portions being substantially equal to the aggregate width of said sections.

In testimony whereof I have affixed my signature.

BETTY F. ROBINSON.